United States Patent [19]

D'Ascoli et al.

[11] 4,038,970
[45] Aug. 2, 1977

[54] SOLAR WATER HEATER

[76] Inventors: John D'Ascoli, 3 S. Shore Drive; Benny F. Rappa, 5 Seaway Drive, both of New Port Richey, Fla. 33552; Thomas M. Sculley, 126 Gulf Highlands Drive, Port Richey, Fla. 33568

[21] Appl. No.: 625,688

[22] Filed: Oct. 24, 1975

[51] Int. Cl.² ............................................. F24J 3/02
[52] U.S. Cl. ................................... 126/271; 165/144
[58] Field of Search ............... 126/270, 271; 237/1 A; 165/144

[56] References Cited

U.S. PATENT DOCUMENTS

| 1,258,405 | 3/1918 | Harrison | 126/271 |
|---|---|---|---|
| 2,553,302 | 5/1951 | Cornwall | 126/271 |
| 3,205,939 | 9/1965 | Huet | 165/144 |
| 3,599,626 | 8/1971 | Bouse | 126/271 |

FOREIGN PATENT DOCUMENTS

| 822,768 | 10/1959 | United Kingdom | 126/271 |
|---|---|---|---|
| 1,301,853 | 1/1973 | United Kingdom | 126/271 |

Primary Examiner—Kenneth W. Sprague
Assistant Examiner—James C. Yueng
Attorney, Agent, or Firm—Stefan M. Stein; Robert F. Frijouf

[57] ABSTRACT

An improved solar water heater construction is disclosed wherein unique intake and exhaust manifold structures are utilized to control the flow of water through a plurality of heater panels. By virtue of the construction of the manifolds and their cooperation with the heater panels, normal valving systems are not necessary to the maintenance of a uniform, balanced flow of water through the improved heater of this invention.

6 Claims, 4 Drawing Figures

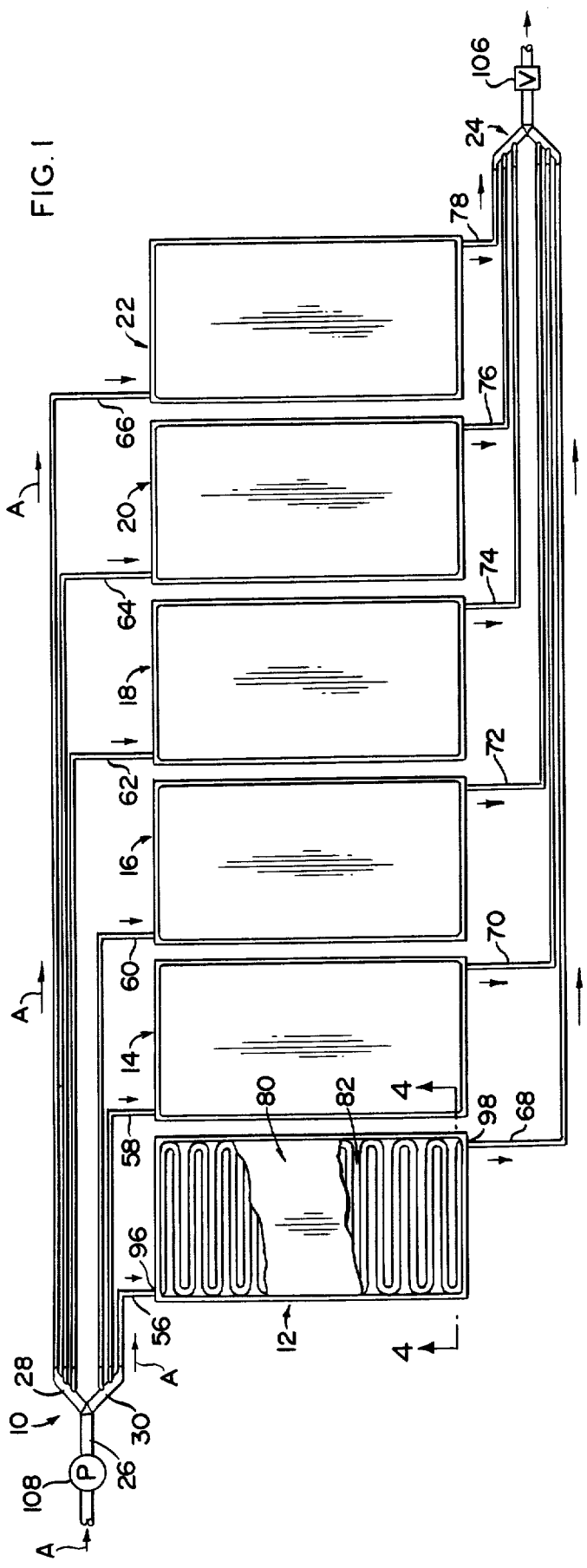
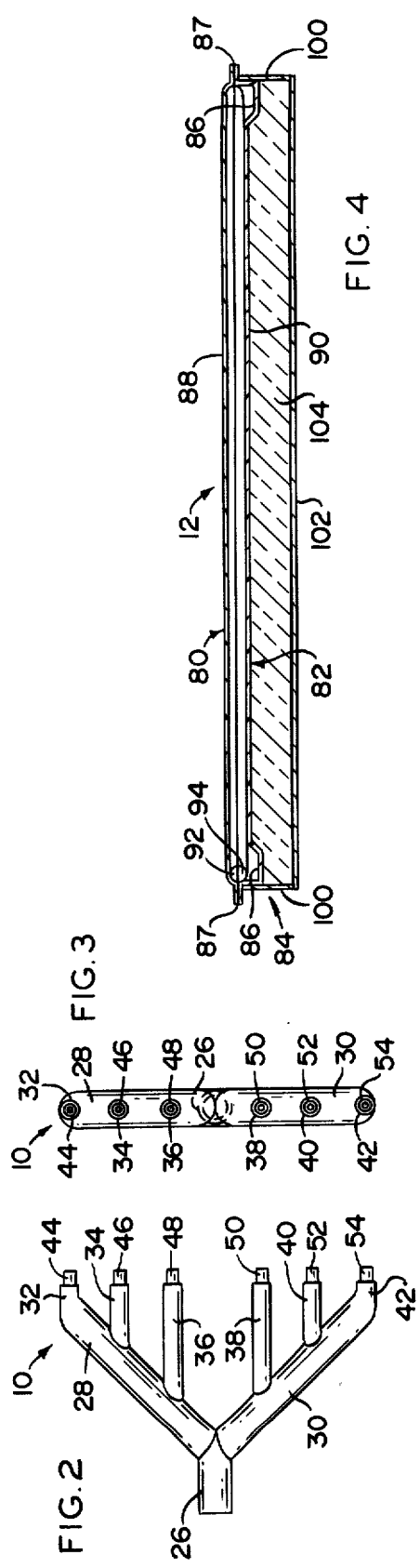

SOLAR WATER HEATER

BACKGROUND OF THE INVENTION

1. Field of the Invention

This invention relates to an improved solar water heater of the type primarily intended for use in heating water wherein the improvement comprises specifically configured intake and exhaust manifold means utilized to control the flow of water through a plurality of solar heater panels disposed in fluid communicating relation between said intake and exhaust manifolds.

2. Description of the Prior Art

Man has long recognized the value of the sun as a source of heat, and as a result of his recognition has constructed various devices for "capturing" the sun's thermal energy to perform useful work. One such class of devices may be referred to generally as solar water heaters wherein the sun's rays are collected in such fashion so as to heat a body or a stream of water.

One of the earliest of such solar water heaters is disclosed in U.S. Pat. No. 659,540. That patent discloses an apparatus wherein the sun's thermal energy is utilized to vaporize a liquid, and the resulting vapor pressure is transformed into a mechanical work force. Somewhat less sophosticated devices used solely for heating water are disclosed in U.S. Pat. Nos. 966,070, 1,802,635, and 2,358,476. Of course, with the recent increase in public awareness and interest in sources of natural energy, there has been a corresponding increase in the research and development of solar heating devices.

However, the result of this increased research and development has often times been a solar heating structure which is so complicated in both its construction and operation as to be economically unfeasible. Of particular note is the fact that most solar water heaters comprise a heat exchanger section including an extremely long series of tubes through which the water passes as the tubes are exposed to the sun's rays. Not only are these long tubes expensive, but also they are quite susceptible to leakage, necessarily resulting in decreased efficiency of the heater. Another problem commonly associated with solar water heaters is that of controlling the flow of water through the heat exchanger section at a rate that will provide sufficient heating while at the same time prevent overheating which could result in rupturing the heater.

The common problems outlined above have heretofore been solved by the use of various valving mechanisms, many of which are actually temperature-operated. That is to say, the flow of water through the solar heater is controlled by selectively opening and closing various valves in response to predetermined atmospheric and water conditions. It should be obvious that such sophisticated valving mechanisms are complicated and therefore significantly affect the cost of solar water heaters. Additionally, because of their complicated construction, they must be very carefully maintained to insure that proper operation. This maintenance requirement further increases the cost of operating and maintaining solar water heaters. It is accordingly obvious that there is great need in the art for a solar water heater of extremely simple construction wherein the flow of water through the heat exchanger may be controlled without the necessity of installing sundry valving mechanisms. In addition, such a water heater should include a heat exchanger section wherein the area of water exposed to the sun's rays is maximized.

SUMMARY OF THE INVENTION

This invention relates to an improved solar heater of the type primarily intended for heating water wherein unique intake and exhaust manifolds are utilized in combination with a plurality of heater panels constructed to maximize the area of water exposed to the warming effects of the sun's rays. As will be described in greater detail hereinafter, the construction of both the intake and exhaust manifolds is such that rate of water flow through the heater panels is regulated to provide a substantially constant flow across each panel, regardless of the number of panels utilized, without the need of employing mechanical valving mechanisms.

Both the intake and exhaust manifolds of the present invention are of identical construction and define a substantially Y-shaped configuration. The base of the Y defines a main water conduit, and the arms of the Y define branches. Formed on each of the branches is at least one supply head whereby heater panels may be interconnected in fluid communicating relation between the intake manifold and the exhaust manifold.

The heater panels of the present invention comprise top and bottom portions, said portions being substantial mirror images of each other. Water flow channeling means comprising divider means are correspondingly formed in both the top and bottom portions. By virtue of their mirror image construction, when the top and bottom portions are placed together, corresponding divider means abut with each other thereby defining a circuitous channel through which the water flows within each heater panel. Of course, the heater panel further includes an intake orifice formed at one end of the water flow channeling means and an exhaust orifice formed at the other end of the water flow channeling A first water conduit is disposed in fluid communicating relationship between one of the supply heads of the intake manifold and the intake orifice formed on one of the heater panels. A second water conduit is correspondingly disposed in fluid communicating relation between the panel's exhaust orifice and one of the exhaust heads of the exhaust manifold. Regardless of the exact number of panels included in the solar heater of this invention, the sum of the length of each pair of first and second water conduits is identical. By virtue of this construction, all water passing through the solar heater travels an identical distance from each of the supply heads to a corresponding one of each of the exhaust heads. This structure insures a balanced flow of water through the improved solar heater, thereby eliminating the necessity of flow-regulating valve means.

In order to maximize the efficiency of each of the heater panels, they further include skirt means disposed in substantially surrounding relation to the sides and base of the bottom portion of each heater panel. The skirt means is essentially a "black body" provided for the obvious purpose of retaining solar energy within the heater panels. Disposed between the skirt and the bottom portion of each heater panel is insulating material, further enhancing the heat retention characteristics of the panel.

This then sets forth the preferred construction for the improved solar heater of the present invention. However, it has been determined that certain auxiliary devices may be desirable. For example, it may be desirable to provide a pressure relief valve operatively disposed downstream of the main exhaust conduit of the exhaust manifold. The purpose of the pressure relief valve is simply to prevent rupture of the improved solar heater should internal pressures exceed a predetermined value as by overheating. Similarly, though not mandatory, it may be desirable to provide pump means operatively disposed upstream of the intake manifold's main intake conduit. The purpose of this pump means is to supply water to the improved solar heater, in its entirety, at a constant, predetermined pressure. It has been determined than an improved solar heater constructed in accord with this invention will operate efficiently at pressures of from 15-100 pounds per square inch, with pressures of from 15-50 pounds per square inch preferable.

The invention accordingly comprises the features of construction, combination of elements, and arrangement of parts which will be exemplified in the construction herein-after set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a plan view of the improved solar heater of the present invention with details of a heater panel means shown in cutaway.

FIG. 2 is a plan view of the intake manifold.

FIG. 3 is an end view of the intake manifold of FIG. 2.

FIG. 4 is a sectional view taken along line 4—4 of FIG. 1.

Similar reference characters refer to similar parts throughout the several views of the drawings.

DETAILED DESCRIPTION

As best seen in FIG. 1, the improved solar heater of the present invention comprises intake manifold means generally indicated as 10 interconnected to a plurality of heater panel means 12, 14, 16, 18, 20 and 22, which are in turn interconnected to exhaust manifold means generally indicated as 24. The specific instruction of intake manifold means 10 is best seen in FIG. 2, and at this point it should be noted that the exhaust manifold means 24 is of substantially identical construction. At this point it should be further noted that while the ensuing detailed description will be given with specific regard to a solar heater comprising six heater panel means, the present invention clearly is not limited to such construction.

As shown in FIG. 2, intake manifold means 10 is substantially Y-shaped, and the base of the Y defines main intake conduit 26. The arms of the Y define supply branches 28 and 30, respectively. Finally, intake manifold means 10 includes a plurality of supply heads 32, 34, 36, 38, 40 and 42 disposed in fluid communicating relation with branches 28 and 30. So that the intake manifold 10 may be interconnected with its associated heater panel means 12, 14, 16, 18, 20 and 22, each of the supply heads includes an attachment tip 44, 46, 48, 50, 52 and 54, respectively, of relatively lesser outside diameter than its corresponding supply head. As previously stated, the construction of exhaust manifold means 24 is substantially identical to that just given with specific regard to intake manifold means 10.

Inasmuch as one of the primary objectives of the present invention is the elimination of the need for valving means to control the flow of water through the improved solar heater, certain relationships between various elements of intake manifold means 10 should be noted. In the preferred construction the inside diameter of main intake conduit 26 is 1.5 inches. The inside diameters of supply branches 28 and 30 are identical, both being 2 inches. Supply heads 32, 34, 36, 38, 40 and 42 are also of identical size, each having an inside diameter of 0.75 inches. Finally, each of the tips 44, 46, 48, 50, 52 and 54 are of the same size, that being an inside diameter of 0.5 inches. It is by virtue of this construction that intake manifold means 10 will provide substantially identical quantities of water to each of its heater panel means regardless of pressure fluctuations upstream of main intake conduit 26. Back pressures within the system are virtually eliminated by virtue of the fact that exhaust manifold means 24 is constructed in a substantially identical fashion.

As shown in FIG. 1, intake manifold means 10 is interconnected in fluid communicating relationship to each of its heater panel means 12, 14, 16, 18, 20 and 22 by corresponding first water conduits 56, 58, 60, 62, 64 and 66, respectively. The inside diameter of each of the first water conduits is the same, and they are attached to intake manifold means 10 by slipping their free ends over a corresponding one of the tips 44, 46, 48, 50, 52, and 54. A water tight fitting is preferably insured by placing a contact-type adhesive on the exterior of each of the tips prior to placing the corresponding first water conduit thereon.

As shown by arrows A in FIG. 1, water enters the improved solar water heater's main intake conduit 26 from whence it is equally distributed to each of the first water conduits. The water then circulates through heater panel means 12, 14, 16, 18, 20 and 22 from whence it is delivered to exhaust manifold means 24 by second water conduits 68, 70, 72, 74 76 and 78, respectively. Each of these second water conduits are of the same inside diameter, and their inside diameter is substantially identical to that of the first water conduits. The second water conduits are attached to exhaust manifold means 24 in fluid communicating relation thereto in the same fashion as more precisely described with regard to the interconnection between intake manifold means 10 and the first water conduits.

While each of the first water conduits and second water conduits have the same inside diameter, it is quite obvious that they are of varying longitudinal dimensions. However, there is a constant relationship between corresponding pairs of first and second water conduits, and this relationship should be noted for it, too, shows a balanced flow of water through the solar heater of this invention. Specifically, it should be noted that the sum of the longitudinal dimension of corresponding pairs of first and second water conduits is substantially constant. That is to say, the sum of the longitudinal dimension of first water conduit 56 and second water conduit 68 equals that of first water conduit 58 and second water conduit 70, equals that of first water conduit 60 and second water conduit 72, equals that of first water conduit 62 and second water conduit 74, equals that of first water conduit 64 and second water conduit 76, and equals that of first water conduit 66 and second water conduit 78.

Having thus described the preferred construction for intake manifold means 10, exhaust manifold means 24, and their associated first and second water conduits, reference should now be had to FIG. 4 wherein details of the construction of heater panel means 12 are given.

It should of course be obvious that each of the remaining heater panel means 14, 16, 18, 20 and 22 are constructed in the same fashion as will be described with specific regard to heater panel means 12. In the cross-sectional view of FIG. 4 it can be seen that heater panel means 12 comprises a top portion 80 overlying a bottom portion 82 and that bottom portion 82 is placed within a skirt means 84. Top portion 80 and bottom portion 82 are substantial mirror images of each other, the only significant difference between the two being the formation of sumps 86 in each of the four corners of bottom portion 82. Top portion 80 and bottom portion 82 must, of course, be attached to each other so as to provide a water tight seal as by disposing a suitable adhesive therebetween along their abutting surfaces 87. For purposes of economy and ease of production, body 88 of top portion 80 and body 90 of bottom portion 82 are formed from the same light-transmissive material. Again, because of their substantially mirror image construction, top portion 80 and bottom portion 82 each include corresponding water flow channeling means comprising divider means 92 and 94, respectively. Thus, when top portion 80 is affixed in operative relationship to bottom portion 82, a single, circuitous water channel is formed, the inside surface of which is defined by corresponding portions of top body 88 and top divider means 92 along with bottom body 90 and bottom divider means 94. Water is admitted into heater panel means 12 from first water conduit 56 through intake orifice 96 and is passed therefrom through exhaust orifice 98 into second water conduit 68. One half of intake orifice 96 and exhaust orifice 98 is correspondingly formed in top portion 80 and bottom portion 82.

In order to maximize the retention of heat within heater panel means 12 and prevent its escape through body 90 of bottom portion 82, a skirt means 84 is disposed in substantially surrounding relationship to body 90. Skirt means 84 basically comprises an open box-like construction having side walls 100 and base 102. Of course side walls 100 and base 102 are formed from a material which is substantially opaque, and side walls 100 are dimensioned so as to support body 90 above base 102 providing a void therebetween. This void is completely filled with a suitable insulating material 104, such as glass wool or styrofoam, to further prevent heat loss through the bottom of heater panel means 12. It is of course desirable to utilize an insulating material 104 which has been thoroughly blackened to provide maximum absorption of the sun's rays.

Through not mandatory, the view of FIG. 1 discloses two additional elements which may be desirable in certain installations of the solar heater. Specifically, it may be desirable to provide pressure relief valve means 106 downstream of exhaust manifold means 24 to vent excessive pressures which might otherwise rupture elements of the solar heater. Pressure relief valve means 106 may comprise any of a variety of well known structures whereby the valve would automatically open in response to a predetermined internal pressure. Additionally, it may be desirable to provide a pump means 108 upstream of intake manifold 10 to insure a constant rate of delivery of water to the solar heater. It should be emphasized that the purpose of pump means 108 is not to regulate the flow of water through the heater, per se, but may be desirable for the sole purpose of providing a constant supply of water to the heater. For example, a construction such as that just described including a pump means 108 may be efficiently utilized to circulate and heat the water of a swimming pool.

While the foregoing description has been given with specific regard to a solar heater comprising six heater panel means and correspondingly configured intake and exhaust manifolds, it is to be understood that the invention is not limited thereto. The precise number of heater panel means actually utilized is determined solely by the quantity of hot water needed. For example, the construction shown in FIG. 1 would be modified to comprise four heater panel means simply by eliminating heater panel means 12 and 22 and their associated first and second wafer conduits and then capping off tips 54 and 44 on intake manifold means 10 and the corresponding tips (not shown) on exhaust manifold means 24. The modified system would still provide a completely balanced flow of water through the solar heater without the necessity of mechanical valving means. Similarly, intake manifold means 10 and exhaust manifold means 24 could be constructed to comprise greater or lesser numbers of supply heads and tips so as to accommodate correspondingly more or fewer heater panel means.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An improved solar heater of the type primarily intended for use in heating water; comprising in combination: a plurality of heater panel means including substantially identical length water flow channeling means formed therein, each of said plurality of heater panel means comprising an intake orifice formed at one end of said water flow channeling means and an exhaust orifice formed at the other end of said water flow channeling means whereby water may enter said intake orifice and travel through said water flow channeling means and exit from said exhaust orifice; intake manifold means including a main intake conduit disposed in fluid communicating relation to a water supply, said intake manifold means further including a pair of substantially oppositely extending supply branches formed thereon and communicating with said main intake conduit, said intake manifold means including a plurality of supply heads formed on said supply branches, a first plurality of water conduits disposed in interconnecting relationship between said plurality of supply heads and said intake orifices of said plurality of heater panel means; exhaust manifold means including a main exhaust conduit comprising a pair of substantially oppositely extending exhaust branches formed thereon and communicating with said main exhaust conduit, said exhaust manifold means including a plurality of exhaust heads formed on said exhaust branches, a second plurality of water conduits disposed in interconnecting relationship between said plurality of exhaust heads and said exhaust orifices of said plurality of heater panel means, and means establishing the sum of the longitudinal dimensions of each pair of said first and second water conduits to be substantially identical throughout said solar heater to provide a balanced flow of water through said heater panel means without the use of mechanical valves.

2. An improved solar heater as in claim 1 wherein each of said plurality of heater panel means comprise correspondingly configured top and bottom portions, and wherein said water flow channeling means comprise said top and bottom portions having divider means correspondingly formed thereon in abutting relation to each other when said top portion is placed on said bottom portion, whereby the flow of water through said heater panel means is regulated along a predetermined route, said route being at least partially defined by said divider means.

3. An improved solar heater as in claim 2 wherein each of said plurality of heater panel means further comprise skirt means disposed in substantially surrounding relation to the sides and base of each of said bottom portions, said skirt means including an insulating material disposed on the interior thereof, whereby solar energy is retained within said heater panel means.

4. An improved solar heater as in claim 1 further comprising pump means operatively disposed upstream of said intake manifold means, said pump means supplying water to said solar heater at a pressure of from 15 to 100 pounds per square inch.

5. An improved solar heater as in claim 1 further comprising pressure relief valve means operatively disposed downstream of said exhaust manifold means, said pressure relief valve means being automatically responsive to a predetermined water pressure, whereby excess pressure may be vented to prevent rupture of said solar heater.

6. An improved solar heater as in claim 1, wherein the sum of the longitudinal dimensions of each water flow path through each of said plurality of heater panel means is substantially identical between said intake and exhaust manifold means.

* * * * *